United States Patent
Nordine

[11] Patent Number: 5,941,607
[45] Date of Patent: Aug. 24, 1999

[54] SAFETY DEVICE FOR A TRUCK WHEEL

[76] Inventor: Peter J. Nordine, Post Office Box no. 6, Queensville, Ontario, Canada, L0G 1R0

[21] Appl. No.: 08/912,756

[22] Filed: Aug. 18, 1997

[51] Int. Cl.$^6$ ....................................................... B60B 7/16
[52] U.S. Cl. .................................. 301/108.4; 301/37.21; 301/105.1
[58] Field of Search .............................. 301/35.62, 36.1, 301/37.21, 37.37, 37.38, 105.1, 111, 108.1, 108.4, 35.61, 108.5

[56] References Cited

U.S. PATENT DOCUMENTS

| | | | |
|---|---|---|---|
| 1,707,458 | 4/1929 | Clench | 301/35.61 |
| 2,305,110 | 12/1942 | Schatzman . | |
| 2,328,301 | 8/1943 | Shaw, Jr. | 301/37.21 X |
| 2,339,122 | 1/1944 | Van Roo . | |
| 2,443,760 | 6/1948 | Arrison | 301/37.38 |
| 2,619,389 | 11/1952 | James . | |
| 3,944,285 | 3/1976 | Vincent . | |
| 4,761,040 | 8/1988 | Johnson . | |
| 4,787,681 | 11/1988 | Wang et al. . | |
| 5,358,313 | 10/1994 | Polka . | |

*Primary Examiner*—Russell D. Stormer
*Attorney, Agent, or Firm*—Dykema Gossett PLLC

[57] ABSTRACT

The invention relates to a safety device for truck wheels. An integral member is provided which is retained in an abutting relationship with the axle of the wheel assembly, but the integral member is free of any connection with the wheel studs of the wheel assembly. The abutting relationship may be provided by having a plurality of holes of the integral member which receive a plurality of the axle studs of the axle. Alternatively, the abutting relationship may be provided by providing a sleeve portion on the integral member and an interior threaded portion within that sleeve that is threaded to the axle of the wheel assembly. A lock screw may then be passed through the integral member to retain the member in the abutting relationship with the axle. An advantage of the present invention is that a strong connection is provided between the axle and the safety device, thus making it possible for the safety device to prevent wheels from flying away from a truck, tractor, or trailer when the wheel studs or rim suffer mechanical failure.

6 Claims, 3 Drawing Sheets

SAFETY DEVICE FOR A TRUCK WHEEL

BACKGROUND OF THE INVENTION

1. Field of the Invention

This invention relates to a safety device for a truck wheel assembly.

2. Description of the Related Art

Truck wheels pose a safety hazard because the rim or wheel studs of the truck wheel can fail when the truck is moving. This allows the truck wheel to fly free from the vehicle and endangers people and property.

This presents a need for safety devices that prevent wheels from flying away from trucks, tractors, and trailers when the wheel studs or wheel rim suffers mechanical failure.

Since this type of wheel rim and wheel stud failure is possible on many existing trucks, a desirable feature of this type of safety device is that it be capable of installation on existing truck, tractor, and trailer wheel assemblies. Further, it is desirable that a safety device for this purpose will not unduly interfere with the wheel studs and will not substantially increase the width of the truck, tractor, or trailer.

SUMMARY OF THE INVENTION

An object of the present invention is to provide an improved safety device for truck wheels.

In accordance with an aspect of the present invention there is provided a safety device for a truck wheel assembly, said assembly comprising an axle, a wheel rim and a plurality of wheel studs, said safety device comprising an integral member, said member in abutting relationship with the axle, means to fixably retain the integral member in the abutting relationship with the axle, said integral member having a radially extending portion, said radially extending portion overlapping the wheel studs, and said integral member free of any connection to the wheel studs.

Preferably, the truck wheel assembly further comprises a plurality of axle studs threaded into an outer end of the axle and the means to retain the integral member in the abutting relationship with the axle comprises a plurality of holes in the integral member receiving the plurality of axle studs in the axle.

In another embodiment of the present invention the axle further comprises an axle cap at an outer end thereof and the integral member further defines a center hole that receives the axle cap of the axle.

In yet another embodiment of the present invention the integral member further comprises an axially extending sleeve portion, said sleeve portion capable of receiving the axle, said sleeve portion having an interior surface, a threaded portion on the interior surface of the sleeve portion, and means to fixedly retain the threaded portion in the abutting relationship with the axle.

In accordance with another aspect of the present invention there is provided a safety device for a truck wheel comprising an integral member having a central axis, said integral member having a portion extending radially from the central axle, said integral member having a sleeve portion extending axially, said sleeve portion having an interior surface, a threaded portion on the interior surface of the sleeve portion, a threaded hole extending radially through the integral member and, a lock screw insertable into the threaded hole.

An advantage of the present invention is that it prevents a wheel from flying away from the wheel assembly when the wheel stud or rim suffers mechanical failure. A further advantage of the present invention is that it does not unduly interfere with the wheel studs of the wheel assembly. A final advantage of the present invention is that it permits a strong connection between the safety device and the axle of the wheel assembly.

BRIEF DESCRIPTION OF THE DRAWINGS

In the drawings which illustrate embodiments of the invention.

DETAILED DESCRIPTION OF THE PREFERRED EMBODIMENTS

The present invention will be illustrated first with an embodiment that provides a safety device for a truck wheel assembly, and in particular a driving wheel assembly.

Figure 1:
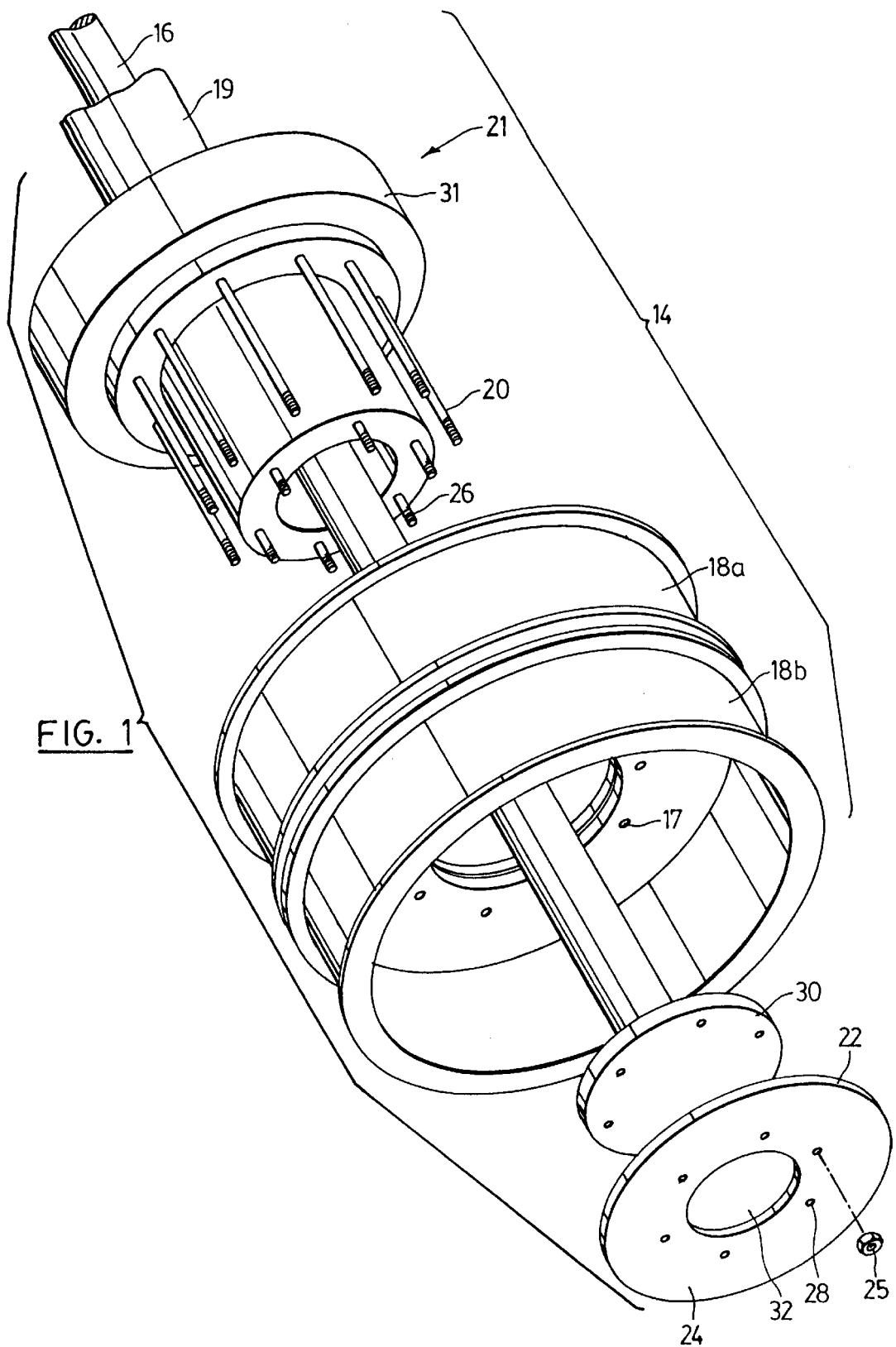
FIG. 1—is an exploded perspective view of a truck wheel assembly and safety device in accordance with an embodiment of the present inventions FIG. 2—is a cross-sectional view of a truck wheel assembly and safety device in accordance with an embodiment of the present invention; and, FIG. 3—is a cross-sectional view of a tractor wheel having a safety device in accordance with a second embodiment of the present invention.
Figure 2:
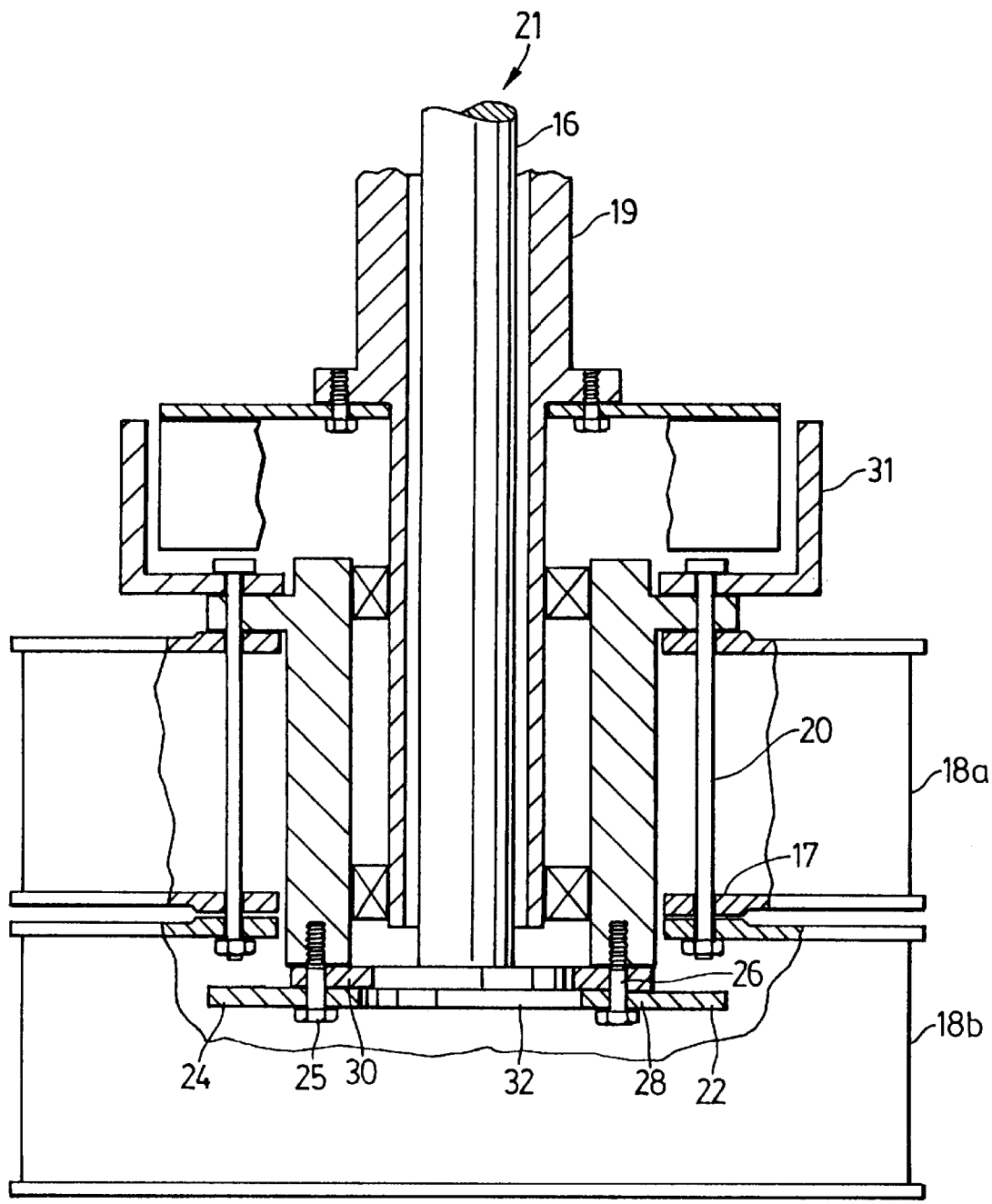

Referring to FIGS. 1 and 2, a driving wheel assembly 14 has an axle 21 comprising an axle shaft 16, which terminates in an axle end cap 30, and a wheel hub 31. The outer end of the axle is attached to wheel hub 31 by means of axle studs 26 which pass through the axle end cap 30 and are threaded into wheel hub 31. The wheel hub 31 is bearing mounted on an axle housing 19. Wheel studs 20 protrude from wheel hub 31 and pass through holes 17 in wheel rims 18a, 18b.

The safety device comprises an integral member in the nature of a disk 22 preferably formed from stainless steel at least ⅜ inches thick. As seen in FIG. 2, the disk 22 is in an abutting relationship with the axle cap 30 of the axle 21. The axle studs 26 extend through holes 28 in disk 22 and nuts 25 are threaded to the axle studs 26 to fixably retain the disk 22 in abutting relationship with the axle cap 30 of the axle 21. The radially extending portion 24 of disk 22 overlaps the wheel studs 20 but the disk 22 is free of any connection to the wheel studs 20.

Sometimes an axle cap 30 of a truck wheel assembly 14 has a protruding centre. Disk 22 further defines a central hole 32 for receiving the protruding portion of such an axle cap 30.

In a second embodiment of the present invention, a safety device is provided for a truck idler wheel assembly as is typically found on a non-driven wheel, such as a trailer wheel.

Figure 3:
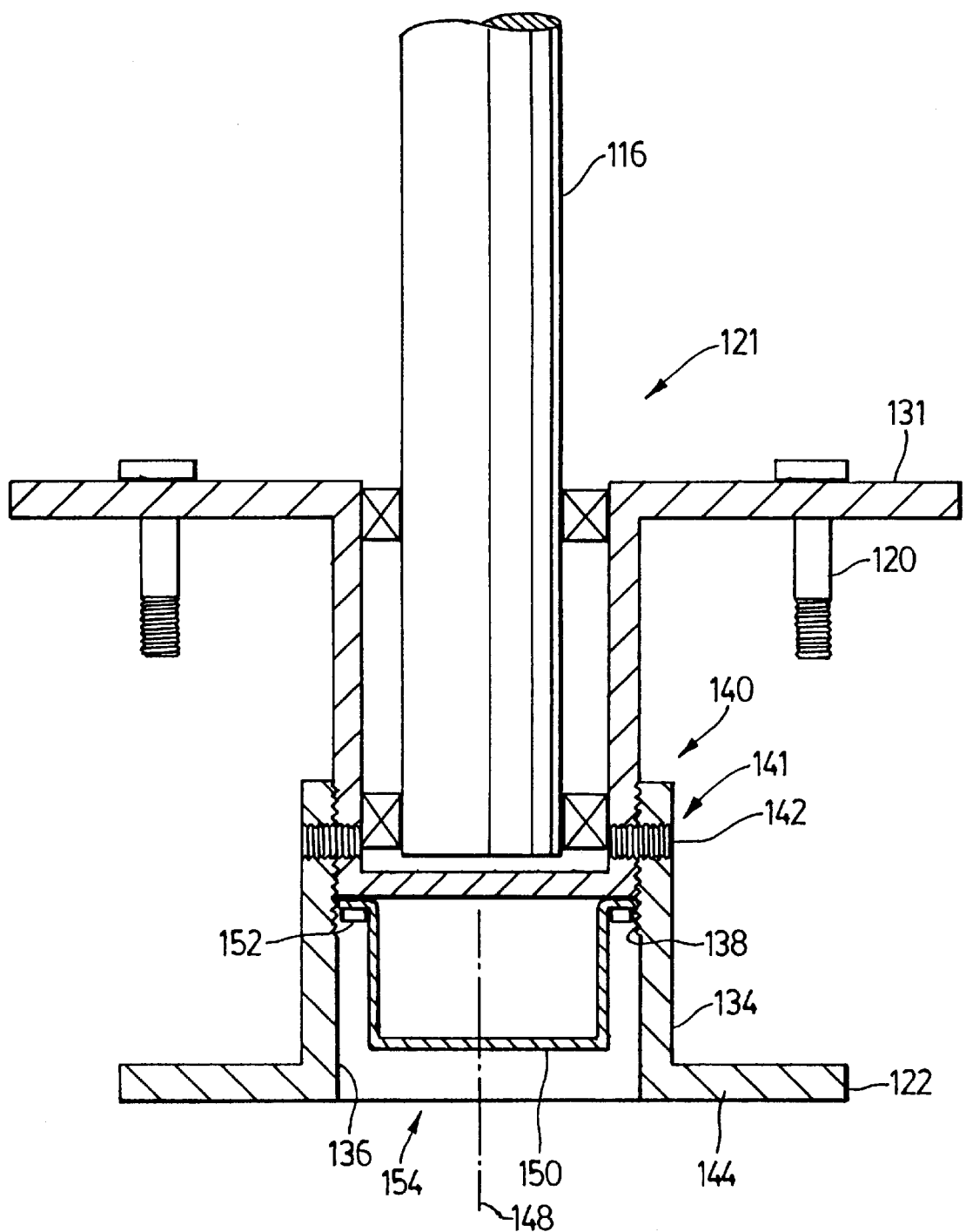

Referring to FIG. 3, in the second embodiment a wheel hub 131 is bearing mounted to axle shaft 116 of axle 121. A plurality of wheel studs 120 extend from the wheel hub 131. The outer end of the exterior surface of the wheel hub 131 has a threaded portion 140. The wheel hub 131 may be manufactured with such a thread or the thread may be die cut into a wheel hub already installed on a truck. An integral member 122 has a central axis 148 with a flange 144 extending radially from the axis and a sleeve portion 134 extending along the axis. The sleeve portion 134 has an interior surface 136 with a threaded portion 138 so that the integral member may be threaded to the wheel hub 131 such that it abuts the wheel hub 131. Means are provided to fixably retain the integral member in abutting relationship with the wheel hub, this comprises transverse threaded holes 141 in the sleeve 134 and collar 131 for receiving lock screws 142. Again, the integral means is preferably formed of stainless steel, at least ⅜ inches thick.

An axle cap 150 covers the outer end of the axle and is bolted by bolts 152 to wheel hub 131. The integral number 122 defines a central hole 154 that receives the axle cap 150.

Those skilled in the art will find obvious certain variations of the disclosed embodiments. For example, instead of lock-screws, cotter pins could be used to maintain the integral member 122 in abutting relationship with the axle.

It will also be apparent to those skilled in the art, that certain components of a conventional truck wheel assembly, such as brake drums, have been omitted from the drawings and from this description.

What is claimed is:

1. A safety device for a truck wheel assembly, said assembly comprising an axle, a wheel rim, a plurality of axle studs threaded into an outer end of the axle, and a plurality of wheel studs retaining the wheel rim, said safety device comprising:
   an integral member;
   said integral member in an abutting relationship with the axle;
   means fixedly retaining the integral member in the abutting relationship with the axle comprising a plurality of holes in the integral member receiving the plurality of axle studs;
   said integral member having a radially extending portion;
   said radially extending portion overlapping the wheel studs; and,
   said integral member free of any connection to the wheel studs.

2. The safety device of claim 1 further comprising an axle cap proximate an outer end of the axle and the integral member further defines a centre hole that receives the axle.

3. A safety device for a truck wheel assembly, said assembly comprising a rotating wheel hub, a wheel rim, and a plurality of wheel studs retaining said wheel rim, said safety device comprising:
   an integral member;
   said integral member in an abutting relationship with the rotating wheel hub;
   said integral member having a radially extending portion;
   said radially extending portion overlapping the wheel studs;
   said integral member free of any connection to the wheel studs;
   said integral member further comprising:
      an axially-extending interiorly threaded sleeve;
      threaded to the rotating wheel hub;
   a threaded transverse hole in the sleeve for receiving a lock screw; and,
   a lock-screw for exerting force against rotating wheel hub.

4. A safety device for a truck wheel assembly, comprising:
   an integral member having a central axis;
   said integral member having a portion extending radially from said central axis;
   an interiorly threaded sleeve extending axially from said radial portion;
   a threaded tranverse hole extending radially through the sleeve; and,
   a lock-screw insertable into the threaded transverse hole.

5. The safety device of claim 4 in which the integral member is formed from stainless steel, not less than ⅜" thick.

6. The safety device of claim 4 in which the integral member is formed from stainless steel, not less than ⅜" thick.

* * * * *